Figure 1:
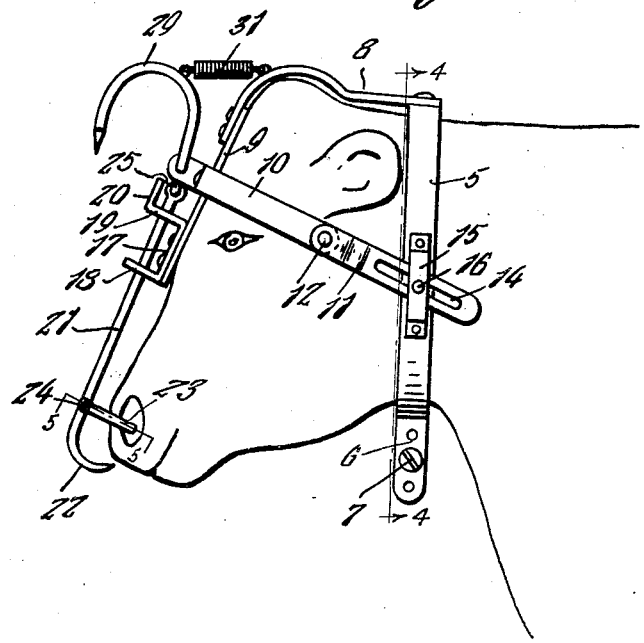

July 28, 1931. A. L. JONES 1,816,807

CATTLE GUARD

Filed Oct. 23, 1929 2 Sheets-Sheet 1

Inventor

Alfred L. Jones

By Clarence A. O'Brien
Attorney

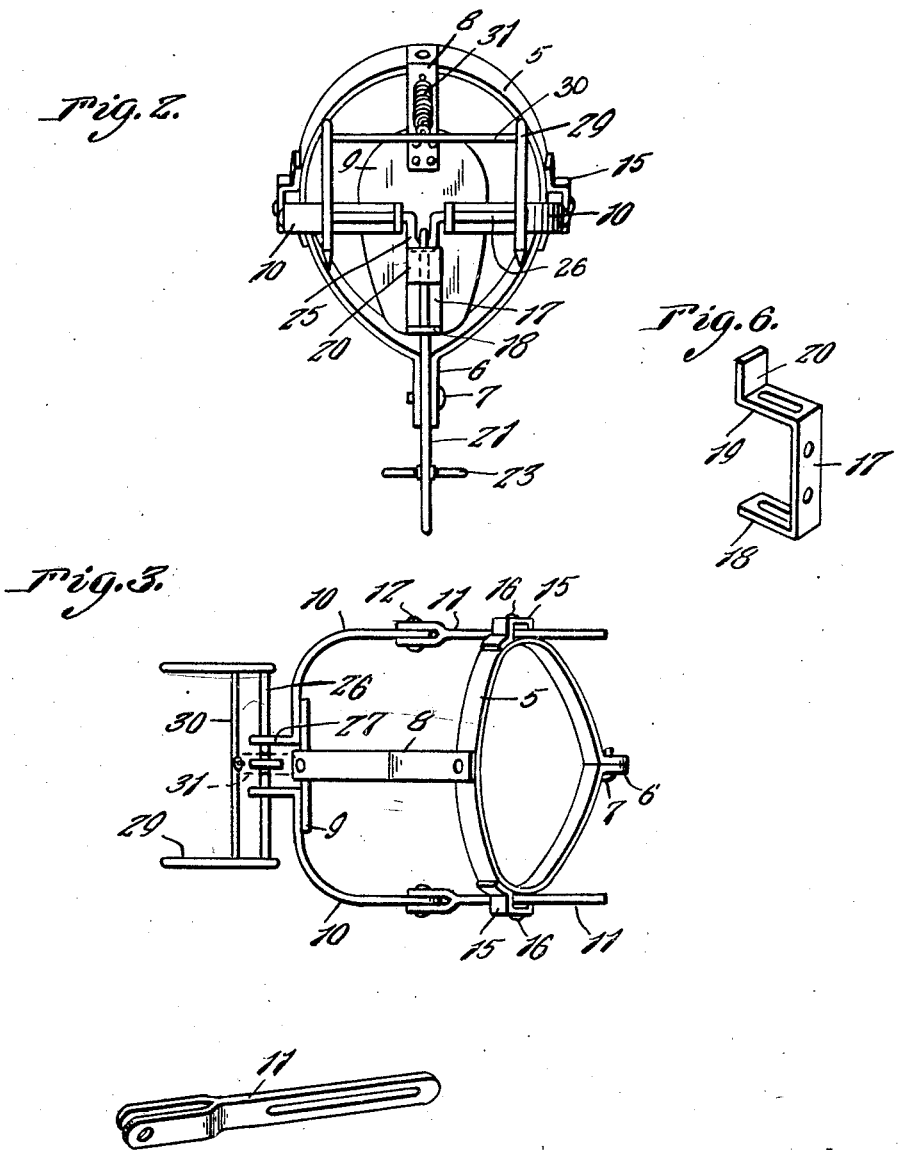

Patented July 28, 1931

1,816,807

UNITED STATES PATENT OFFICE

ALFRED LEE JONES, OF GREEN CITY, MISSOURI

CATTLE GUARD

Application filed October 23, 1929. Serial No. 401,682.

The present invention relates to certain new and useful improvements in anti-goring devices, and has as its primary object certain new and useful improvements in an anti-goring device for bulls which forms the subject matter of Patent No. 1,705,220 granted to me under date of March 12, 1929.

A very important object of the invention resides in the provision of a cattle guard of this nature which gives the cattle freedom of movement for ordinary grazing purposes.

A further important object of the invention resides in the provision of a device of this nature which is comparatively simple in its construction and may be manufactured at a low cost and yet be found thoroughly efficient and reliable in use.

With the above and numerous other objects in view as will appear as the description proceeds, the invention resides in certain novel features of construction, and in the combination and arrangement of parts as will be hereinafter more fully described and claimed.

Figure 4:
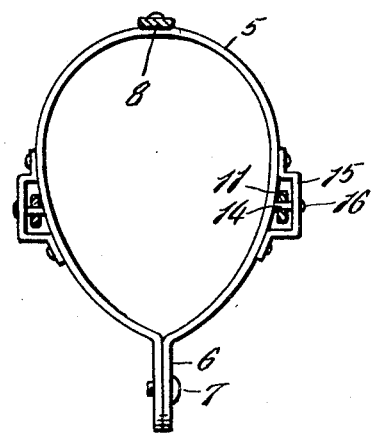
Figure 5:
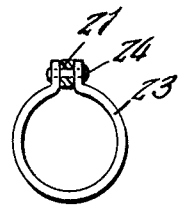

In the drawings:

Figure 1 is a side elevation of the device embodying the features of my invention showing the same on the head of an animal, Figure 2 is a front elevation thereof, Figure 3 is a top plan view thereof, Figure 4 is a sectional view taken substantially on the line 4—4 of Figure 1, Figure 5 is a detail sectional view taken substantially on the line 5—5 of Figure 1, Figure 6 is a perspective view of a guide bracket, Figure 7 is a perspective view of one of the side links.

Referring to the drawings in detail it will be seen that the numeral 5 denotes a collar or yoke disposed about the neck of the animal and being of the split type having the ends at the bottom and terminating in downwardly projected apertured ears 6 to be fastened together by suitable fastening means 7.

A head bar 8 projects forwardly from the top of the yoke over the head of the animal and extends down in front of its forehead, and on the front terminal thereof has attached thereto a forehead plate 9 on which are fixed the forward ends of curved side bars 10 which project to the sides of the head of the animal terminating about below the ears thereof.

Links 11 are pivotally connected as at 12 with these bars 10 and have elongated slots 14. Guide brackets 15 are mounted on the sides of the yoke 5 and the links extend therethrough and each side bracket has a pin 16 projecting through a slot 14. This arrangement provides, because of a certain amount of flexibility of the material of the bar 8, for a movement of the forehead blade 9, with relation to the neck band, during the movement of the animal.

A guide bracket 17 is fixed at the bottom end of the forehead plate 9 and has upper and lower forwardly projecting slotted ears 18 and 19 respectively at the ends thereof.

An upwardly directed lip 20 is formed on the front end of the ear 19. A rod 21 is slidable through the slots of the ears 18 and 19 and terminates at its ends in a curved rearwardly directed extension 22, the end of which is in the form of a point to engage the nose of the animal.

A nose ring 23 is pivotally engaged as at 24 with the rod 21. The upper end of the rod 21 terminates in an eye 25 received on the crank of a crank shaft 26 which is journaled in the ears 27 projecting forwardly from the front ends of the side bars 10. On the ends of this crank shaft there are formed forwardly and downwardly curved extensions 29 terminating in points and these extensions are connected by a cross member 30.

A spring 31 is connected to the cross member and with the head bar 8 to normally hold the extensions 29 upwardly.

From the above detailed description it will be seen that if the animal attempts to butt any object the extensions 29 will be swung downwardly and prick the animal's face and simultaneously the rod 21 will be lifted upwardly by the action of the crank shaft so that the extension 22 will prick the animal's nose.

Of course the spring 31 returns the parts and holds them in normal position as shown in Figure 1.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an anti-goring device for bulls of the class described, a head frame comprising a neck yoke, a head bar projecting forwardly from the top of the yoke and terminating in a downwardly disposed terminal, a forehead plate fixed to the terminal, side bars fixed to the plate and extending rearwardly and sidewardly, links pivotally engaged with the rear ends of the side bars having longitudinally extending slots, guide brackets on the sides of the yoke through which the links slidably extend, and pins in the side brackets and through the said slots for limiting the sliding movement of the links, and a nose-engaging piercing element, and means for actuating said element mounted on said forehead plate.

2. In an anti-goring device for bulls comprising a head frame comprising a neck yoke, a head bar projecting forwardly from the top of the yoke and terminating in a downwardly disposed terminal, a forehead plate fixed to the terminal, side bars fixed to the plate and extending rearwardly and sidewardly, links pivotally engaged with the rear ends of the side bars having longitudinally extending slots, guide brackets on the sides of the yoke through which the links slidably extend, and pins in the side brackets and through the slots, another guide bracket on the forehead plate, a rod slidable through the bracket and having at its bottom end a rearwardly curved pointed extension, a nose ring pivotally engaged with the rod adjacent this extension, the upper end of the rod terminating in an eye, ears projecting from the forward ends of the side bars, a crankshaft journaled in the ears having its crank disposed between the ears and received in the eye and curved extensions on the ends of the crank shaft terminating in points, a cross member between the last mentioned extensions, and a spring engaged with the cross member and with the head bar.

3. An anti-goring device for bulls of the class described comprising a head frame comprising a neck yoke, a head bar projecting forwardly from the top of the yoke, and terminating in a downwardly disposed terminal, a forehead plate fixed to the terminal, side bars fixed to the plate and extending rearwardly and sidewardly, links pivotally engaged with the rear ends of the side bars and having longitudinally extending slots, and guide brackets on the sides of the yoke through which the links slidably extend, and pins in the side brackets and through the said slots, and another guide bracket on the forehead plate, a rod slidable through the bracket and having at its bottom end a rearwardly curved pointed extension, the nose ring pivotally engaged with the rod adjacent its extension, the upper end of the rod terminating in an eye, and ears projecting from the forward ends of the side bars, a crank shaft journaled in the ears having its crank disposed between the ears and received in the eye and curved extensions on the ends of the crank shaft terminating in piercing points, said other guide bracket comprising a plate secured upon the lower portion of the forehead plate, and right angularly and outwardly disposed portions on each edge of the plate, and an upwardly directed portion on the end of the upper of said portions for limiting the motion of the crank.

In testimony whereof I affix my signature.

ALFRED LEE JONES.